United States Patent [19]
Berg

[11] 3,870,484
[45] Mar. 11, 1975

[54] INDUSTRIAL SCRUBBER
[75] Inventor: Roy E. Berg, Ft. Lauderdale, Fla.
[73] Assignee: Interstate Utilities Corporation, Miami, Fla.
[22] Filed: June 13, 1972
[21] Appl. No.: 262,317

[52] U.S. Cl............... 55/229, 55/223, 55/226, 55/241, 55/267, 55/314, 55/502, 261/21, 261/23 R, 261/112
[51] Int. Cl............................................ B01d 45/10
[58] Field of Search............. 55/223, 119, 233, 102, 55/229, 16, 118, 236, 240, 288, 241, 286, 502, 302, 505, 314, 486, 436; 261/23 R, 108, 112, 114, 118, 152, 154, 21

[56] References Cited
UNITED STATES PATENTS

| | | | |
|---|---|---|---|
| 671,375 | 4/1901 | Gallaher | 261/112 |
| 1,103,306 | 7/1914 | Maher | 55/486 |
| 1,289,439 | 12/1918 | Glassford | 261/DIG. 9 |
| 1,888,022 | 11/1932 | Wintermute | 55/119 |
| 1,920,682 | 8/1933 | De Saugy | 261/112 X |
| 1,922,075 | 8/1933 | Brelsford | 261/112 |
| 1,974,768 | 9/1934 | Daniels et al. | 261/112 |
| 2,045,519 | 6/1936 | Coutant | 55/102 |
| 2,337,983 | 5/1941 | Fisher | 261/21 X |
| 3,353,800 | 11/1967 | Jens | 55/241 X |
| 3,570,218 | 3/1971 | Finney | 55/118 |
| 3,686,830 | 8/1972 | Huntington | 55/233 |
| 3,726,064 | 4/1973 | Rowly | 55/241 |

FOREIGN PATENTS OR APPLICATIONS

| | | | |
|---|---|---|---|
| 115,265 | 10/1945 | Sweden | 55/233 |
| 143,168 | 3/1951 | Australia | 55/288 |
| 518,461 | 1/1931 | Germany | 55/286 |
| 730,789 | 5/1932 | France | 261/112 |
| 853,372 | 10/1952 | Germany | 55/302 |
| 1,072,499 | 12/1959 | Germany | 211/81 |

Primary Examiner—Frank W. Lutter
Assistant Examiner—Neil F. Greenblum
Attorney, Agent, or Firm—Howard E. Thompson, Jr.

[57] ABSTRACT

An industrial scrubber is provided comprising a plurality of vertical, thick-walled, scrubber tubes which are removeably mounted in a support base and arranged in a staggered relationship with respect to the direction of flow of a gas stream conveyed and circulated therethrough. The scrubber also includes means for supplying water upwardly through the scrubber tubes so that the water is forced out of their tops and flows down and about the outer surfaces of the scrubber tubes, and means for removing contaminated water from the vicinity of the scrubber. Since the scrubber tubes are removeably mounted, they can be readily and easily removed and replaced when and as desired or required with a minimum loss of time in operation of the scrubber.

5 Claims, 8 Drawing Figures

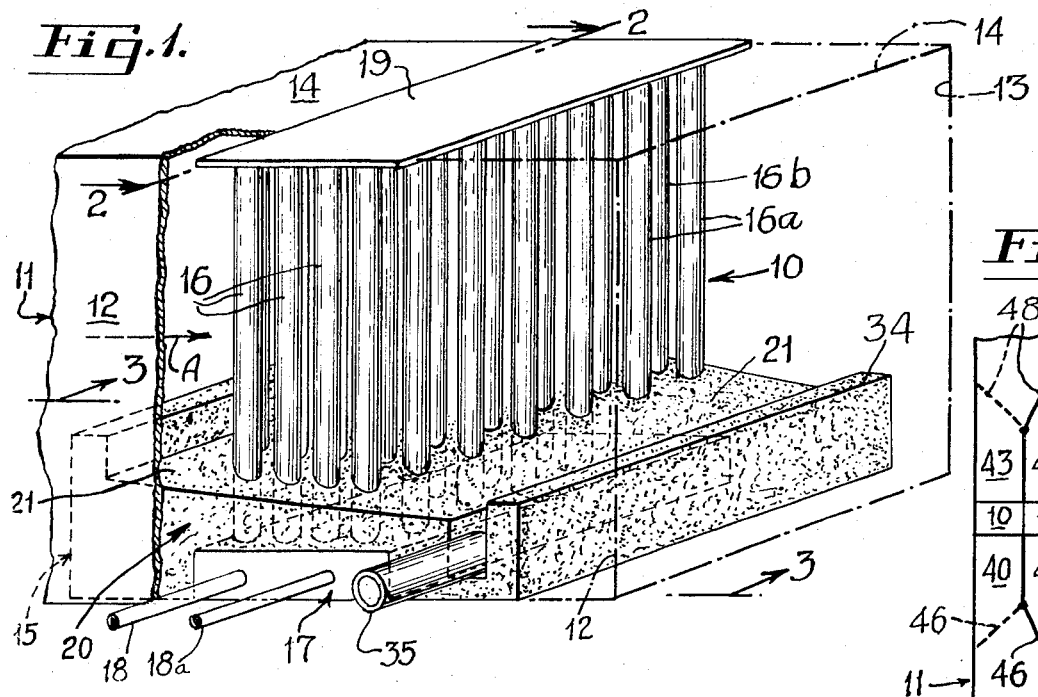
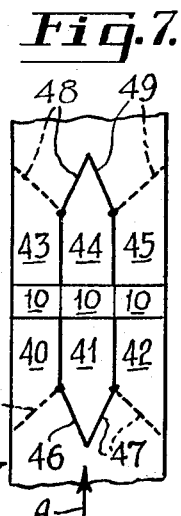
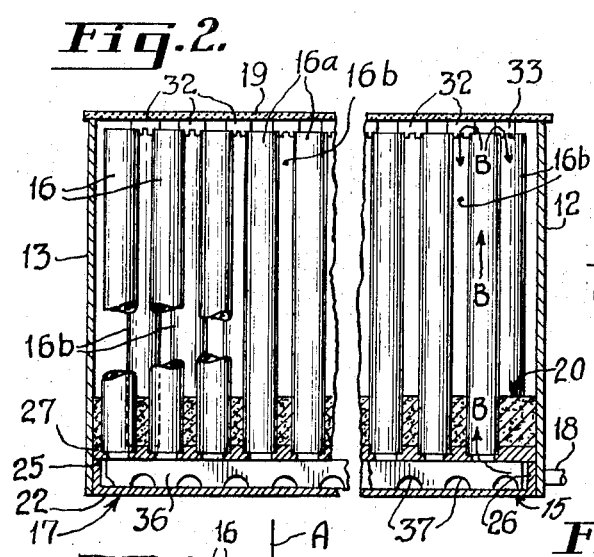
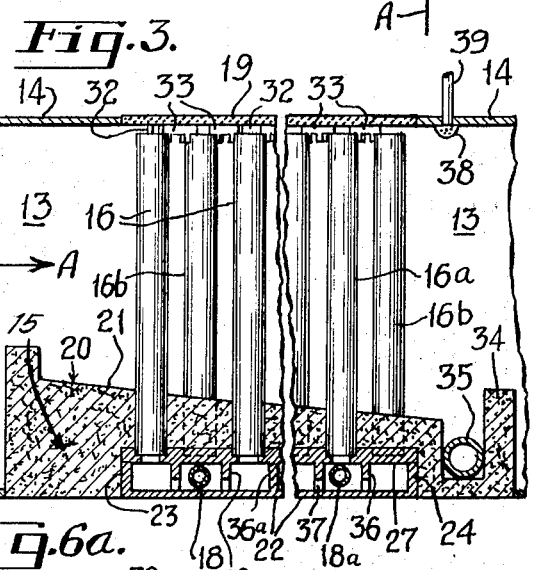
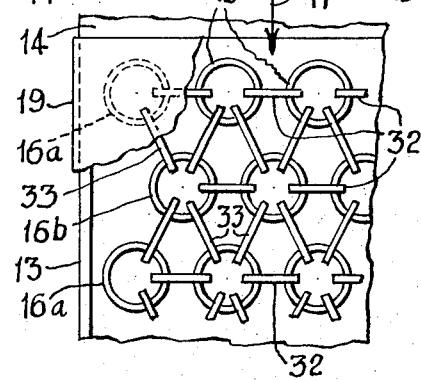
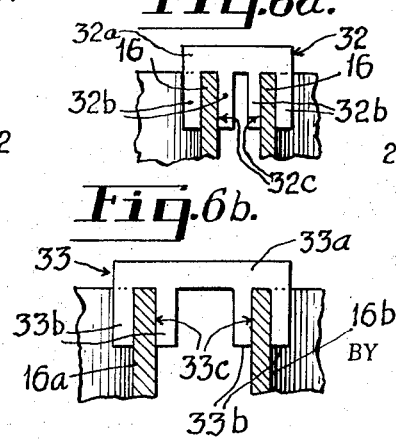
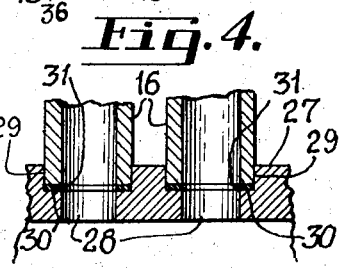

INDUSTRIAL SCRUBBER

BACKGROUND OF THE INVENTION

Industrial scrubbers are employed to cleanse gases carrying waste materials and pollutants generated in connection with such operations as incineration of garbage and refuse, steel production, metalurgical processing, fuel refining, and the like. These operations give rise to the production of waste gases containing solid waste particles and gaseous pollutants such as sulfur dioxide, sulfur trioxide, chlorine, and the like, which must be removed therefrom before the gas can be exhausted into the atmosphere. In view of the present desire and necessity to decrease enviormental pollution, particularly to our atmosphere, it is of paramount importance that means be provided to substantially reduce or eliminate solid particulate and noxious gaseous pollutants such as by providing economical and efficient scrubbers.

Conventional scrubbers presently in use generally comprise relatively thin-walled, irregularly shaped hollow members which are secured in place by welding their lower ends to a support plate. When water is pumped upwardly through these relatively thin-walled members and the waste gases being circulated therethrough are hot, a significant temperature differential is created between the top and bottom of these members; an undesirable condition since it soon damages the members.

This condition can be off-set somewhat by providing a smaller pipe within the thin-walled, irregularly shaped member, pumping the water into the top of the pipe and permit the water to flow upwardly within the thin-walled member until it overflows out of the top thereof. However, the water flow is relatively slow, and solid particles carried by the waste gas stream have been found to enter and settle in the upflowing stream of water. Ultimately, these solid particles accumulate at the bottom of the pipe within and at the base of the thin-walled member. As a result, a thick slurry or sludge forms thereby reducing the effectiveness of the thin-walled member and often rendering it totally inoperative by cutting off the flow of water therethrough.

Another problem which these scrubbers develop is that of corrosion, particularly at the weld points, which are required to provide the irregular cross sectional contours and to secure the thin-walled members in place. The gaseous pollutants, such as sulfur dioxide, sulfur trioxide, chlorine, and the like, carried in the waste gas stream are converted into acids upon contacting the water and attack these weld spots corroding and weakening them so that the thin-walled members become unsafe and inoperative. When the thin-walled members become thusly inoperative, ineffective or weakened, they must either be repaired or replaced thereby requiring that, not only the scrubber, but the entire system with which the scrubber is being employed be shut down.

It has now been found that these problems can be eliminated or materially and substantially reduced by employing the new and improved industrial scrubber of this invention. Generally, the improvement of the scrubber of the invention resides in providing a plurality of vertical, tubular members detachably mounted to an apertured base plate which forms the top member of a water supply chamber; and, providing detachable spacing and interconnecting means at the upper ends of said tubular members so that they are supported in a predetermined, spatial arrangement.

The apertures in the base plate are arranged in rows which are staggered with respect to the intended flow of waste gases through the scrubber and each aperture registers with an enlarged recess which is in coaxial alignment with the aperture, extends partially through the base plate, and is of a size to receive the lower end of a tubular member therein. In one embodiment, gasket material can be provided in the recess to cushion and seal the engagement of the tubular member in the recess, but it should be understood that there is no physical attachment of the tubular members to the base plate.

The industrial scrubber of the invention will become more readily understood when considered together with the accompanying drawing in which the several views shown are illustrative of a scrubber embodying the invention and wherein:

FIG. 1 is a perspective view of the industrial scrubber of the invention with part of the associated duct walls shown in dotted lines for clarity;

FIG. 2 is a transverse sectional view of the scrubber shown in FIG. 1 looking in the direction of arrows 2—2 of FIG. 1;

FIG. 3 is a sectional view of the scrubber shown in FIG. 1 looking in the direction of arrows 3—3 of FIG. 1;

FIG. 4 is an enlarged, fragmentary sectional view of the base of two adjacent tubular members as seen in FIG. 2;

FIG. 5 is a fragmentary top plan view of a portion of the scrubber shown in FIG. 2, illustrating an arrangement of coupling and spacing means which can be used for the upper ends of the tubular members;

FIGS. 6a and 6b are enlarged views of the spacing and coupling means for the tubular members as illustrated in FIG. 5; and, FIG. 7 is a diagramatic plan view of one manner in which a plurlaity of scrubber units of the invention can be employed with means provided for deflecting the gas flow therethrough.

Referring first to FIG. 1, the scrubber of the invention, generally identified by reference numeral 10, is shown assembled in association with the environment with which it is to be employed as represented by duct work, generally identified by 11, through which a stream of waste gases will be directed to flow as indicated by arrow A to be circulated through the scrubber 10. Duct 11 typically comprises side walls 12, 13, top 14 and support base 15.

Scrubber 10 generally comprises a plurality of vertical tubular members 16 which are preferably steel or iron tubes having a wall thickness of about 1/2" or more and which are mounted in a water box, generally denoted by 17. Water is supplied to the water box 17 from a suitable source through a plurality of conduits, two of which are shown at 18 and 18a. A removable metal plate 19 is positioned across the tops of the scrubber tubes 16 spaced apart from the upper ends thereof and acts to deflect water coming out of the tops of scrubber tubes 16 downwardly so that the water will flow down and cascade about the outer surfaces of scrubber tubes 16.

Alternatively, plate 19 can comprise a shallow, double walled structure or box equipped with baffles or other suitable means for circulating cooling water therethrough and thus serve to further quickly lower the temperature of the hot waste gases circulated through scrubber 10 before they are exhausted to the atmosphere.

In one embodiment, scrubber 10 is provided with means to remove the water containing particulate solid and gaseous pollutants from the vicinity of the scrubber 10. One such removal means is generally denoted by reference numeral 20 and is formed to have an inclined surface 21 so that contaminated water can be gravity fed away from scrubber 10.

As seen more clearly in FIGS. 2 and 3, water box 17 comprises a bottom member 22, side walls 23, 24, end walls 25, 26, and a top member 27 which is the base plate in which scrubber tubes 16 are mounted. Hence, water box 17 is completely enclosed and is manufactured to contain a large volume of water without leaking.

With reference to FIG. 4, it can be seen that top member 27 of water box 17 is provided with a plurality of apertures 28 which extend through top member 27. Coaxially aligned with each aperture 28 is an enlarged recess 29 which extends partially through the top members 27 to form a shoulder 30 upon which the ends of scrubber tubes 16 can be set in place. The diameter of apertures 28 should be about equal to the inside diameter of scrubber tubes 16 so that water can be readily supplied to scrubber tubes 16 from water box 17. The diameter of recesses 29 should be large enough to receive the scrubber tubes 16 and, in a preferred embodiment, are of a size so that the lower portions of scrubber tubes 16 are closely fitted in recesses 29. From this arrangement, it can be seen that scrubber tubes 16 are not physically secured to top member 27 but are merely set in place on shoulders 30 and positioned therein by recesses 29. In a preferred embodiment, a gasket material 31 can be provided on shoulder 30 to cushion the ends of scrubber tubes 16.

As described above, apertures 28 are provided in top member 27 in a staggered arrangement with respect to the gas flow so that when scrubber tubes 16 are set therein, they form a labyrinthian passage, as shown in FIG. 5, through which the gas stream must pass, the gas flow direction again being indicated by arrow A. Hence, the scrubber tubes 16 are arranged in parallel rows 16a and 16b so that each row 16a is offset from each adjacent row 16b transverse to the flow direction of the gas stream.

In order to maintain proper spacing between the scrubber tubes 16 in each row 16a and those in each adjacent, off-set row 16b, and also provide stability to the vertical scrubber tubes 16, spacing and coupling means, generally identified by 32 and 33, are employed to interconnect the tops of scrubber tubes 16 to each other.

These spacing and coupling means 32, 33 are illustrated in greater detail in FIGS. 6a and 6b. As shown in FIG. 6a, spacing and coupling means 32 comprises a crosshead 32a having legs 32b protruding from the ends thereof and spaced to provide notches 32c which are of sufficient width so that they can slide over the upper ends of adjacent scrubber tubes 16. Spacing and coupling means 33 (FIG. 6b) is similarly comprised of legs 33b and notches 33c except that crosshead 33a is longer than crosshead 32a of spacing and coupling means 32.

As indicated in FIG. 5, spacing and coupling means 32, are used to couple the scrubber tubes 16 in each row 16a or 16b to each other, while spacing and coupling means 33, being of a longer length, are used to couple the scrubber tubes 16 in the adjacent rows 16a and 16b to each other. Within the body of the scrubber 10, therefore, each scrubber tube 16 will be engaged by six spacing and coupling means consisting of two spacing and coupling means 32 and four spacing and coupling means 33, as can be readily determined from FIG. 5.

Once the scrubber tubes have been set in place in the top member of the water box and their upper ends have been engaged by the spacing and coupling means as described above, metal plate or box 19 can be simply set in place on top of the spacing and coupling means 32, 33 and thereby be spaced apart from the tops of the scrubber tubes 16 as shown in FIGS. 2 and 3.

As mentioned earlier, a preferred embodiment includes a contaminated water removal means 20 with an inclined surface 21 so that the contaminated water can be gravity fed away from the scrubber 10 (FIG. 1). The water removal means can be readily provided from any casting material such as cement, ceramics, and the like. After the scrubber tubes 16 have been set in place in the recesses 29 in the top member 27 of water box 17, and their tops have been engaged by spacing and coupling means 32, 33, so that they are firmly supported in their desired arrangement, a suitable form can be erected about the perimeter of scrubber 10 and a casting material in fluid state can be poured into the form and be permitted to set or cure. As set, in association with the water box 17, this assemblage comprises the support base 15. If desired, the entire assemblage can be tilted so that the fluid casting material can seek its own level prior to settling or curing thereby assuring a smoothly formed inclined surface 21. Other methods of forming the water removal means 20 and inclined surface will become apparent to those skilled in the art. Once secured, the metal plate or box 19 can be set in place as described above.

Since the scrubber tubes 16 are preferably metal, the casting material will not be bonded to them, but will be closely formed around them. Further, since the scrubber tubes 16 are relatively thick-walled, they are rigid and durable and can be moved about without difficulty thereby enabling them to be removed and replaced with relative ease as and when removal and/or replacement is desired or required. If desired, however, the bottom portions of the scrubber tubes 16 can be coated with a wax, grease or other substance before pouring the casting material to form the water removal means 20, thereby further facilitating removal of the scrubber tubes 16 therefrom.

To assist the removal of contaminated water from the scrubber 10, the lower end of the water removal means 20 can be adapted with a trough 34 (FIG. 3) registering with a conduit 35 to discharge the contaminated water. By means of conduit 35, the contaminated water can be fed to conventional settling ponds, centrifuging means, filtering means, and the like, whereupon the suspended solid waste particles can be removed and the water further treated by conventional purification methods until sufficiently cleaned. Thereafter, the cleaned water can be recycled back to the water box 17 for further circulation through the scrubber 10. In this manner, a continuous, self-contained system can be provided.

In large installations where a great many scrubber tubes 16 will be required or where a substantial amount of weight will be exerted upon the top member 27 of water box 17, it might be desirable to provide further support for the top member 27. This can be accomplished by employing a plurality of support beam members 36 as shown in FIGS. 2 and 3. The support beam members 36 can be made from steel or iron and formed with U-shaped cut outs 37 at their lower ends in order to accommodate the passage of water therebetween so that the water box 17 and the scrubber tubes 16 can be readily and easily filled with water. The support beam members 36 are aligned as shown in FIG. 3 so that they are placed between top member 27 and bottom member 22 of water box 17 and disposed between the successive parallel rows 16a and 16b of scrubber tubes 16. The support beam members 36 can be secured into place by spot welding them to the bottom member 22 and the top member 27 or forming them so that they can be closely fitted therebetween.

As indicated earlier, the scrubber 10 of the invention is provided with water through conduits 18 and 18a at a sufficient pressure and velocity so that, once the water box 17 and scrubber tubes 16 are filled with water, only a minimal pressure is necessary to pump the water through the scrubber tubes 16 and have it flow out of their tops and then cascade down about their outer surfaces. This flow of water is indicated by arrows B in FIG. 2. As the water circulates down and about the scrubber tubes 16, solid waste particles, such as incombusted debris, as well as gaseous pollutants are all removed from the gas stream being circulated and conveyed through the scrubber 10 in a labyrinthian path past the scrubber tubes 16. The staggered arrangement of the scrubber tubes 16 coupled with the water cascading and flowing down and about their outer surfaces creates a baffle effect for the gas stream so that the gaseous pollutants and solid waste particles carried by the gas stream are readily trapped by the water upon contact. This contaminated water is then gravity fed by means of inclined surface 21 and conduit 35 and thereby removed from the scrubber 10.

Since the temperature of the waste gases are highest when they first enter scrubber 10, it is desirable to reduce their temperature as rapidly as possible. To accomplish this, conduits 18 and 18a can supply water through water box 17 from independent sources, and water box 17 can be transversely partitioned by a solid plate such as at 36a in FIG. 3. In this embodiment, conduit 18 supplies water to only the first few rows of scrubber tubes 16 by virtue of the solid separator plate 36a and, by utilizing a separate pump means, the cooling water can be supplied to these initially contacted scrubber tubes 16 at a greater volume and pressure than that supplied to the remaining scrubber tubes by conduit 18a. In this way, the excess water will help to more rapidly lower the temperature of the hot waste gases before they are passed through the remaining tubes in the scrubber and ultimately exhausted into the atmosphere.

On occasion, it will be found that the gas stream being circulated and conveyed through the scrubber 10 is of such a high temperature that it is not sufficiently cooled upon emerging from the scrubber 10 to be permitted to be exhausted into the atmosphere. Typically, the gas stream entering the scrubber 10 could be at a temperature as high as about 400°F. and, since the water used to "scrub" the gas stream will be at tap water temperatures, the cleaned gas will be cooled sufficiently to about 200°F. so that it can be readily exhausted. However, when the temperature of the cleaned gas is too high, such as at about 220°F. or higher, it might be desirable to further cool it before it is exhausted. This can be achieved by providing a plurality of sprinkle nozzles 38 (FIG. 4) which can be secured to the top 14 of duct 11 adjacent the plate or box 19 on the exhaust side of scrubber 10 through which cooled water can be supplied by suitable conduits 39 to be sprayed down through the cleaned gas to further reduce its temperature before it is exhausted.

From the foregoing description of the invention, it will be apparent that the scrubber tubes can be readily removed and easily replaced with new scrubber tubes as and when it is desired or required to do so. Due to the ease and speed with which the scrubber tubes can be removed and replaced, operational down-time is greatly reduced and minimized. In some instances, however, it might be desirable to have a continuous operation. This can be readily accomplished since the scrubber of the invention can also be provided in a plurality of individual scrubber units with means to divert the gas stream from one unit to another. In this manner, one or more scrubber units can be used to cleanse the gas stream while one or more other units serve as standby units which can be pressed into service to handle larger volumes of waste gases or be used while another is being cleaned or repaired.

One way in which a plurality of scrubber units can be provided, including means for diverting the waste gas stream from one unit to another, is diagramatically illustrated in FIG. 7. As shown therein, a plurality of scrubber units 10 are arranged side by side and, assuming a gas stream flow in the direction of arrow A, are provided on one side with inlet ducts or chambers 40, 41, 42, and on the other side with outlet ducts or chambers 43, 44, 45, each inlet and outlet duct communicating with one scrubber unit 10. Inlet ducts 40, 41, 42, can be provided with closure means, such as vanes or valves 46, 47, and outlet ducts 43, 44, 45, can be similarly provided with closure vanes or valves 48, 49. Vanes or valves 46, 47 can then be used to close off inlet duct 41 as shown by their full line positions in FIG. 7 while vanes or valves 48, 49 are used to shut off inlet duct 44 thereby closing the scrubber unit 10 with which inlet duct 41 and outlet duct 44 commonly communicate. Similarly, inlet ducts 40 and 42 and outlet ducts 43 and 45 can be closed off by positioning vanes 46, 47 and 48, 49 to the dotted line positions shown in FIG. 7, it being obvious that an inlet and outlet duct communicating with the same scrubber unit 10 must be thusly closed off in order to close a scrubber unit.

By employing a plurality of scrubber units, associated inlet and outlet ducts communicating therewith, and means to close off one or more units so that the waste gas stream can be deflected and diverted from one scrubber unit to another, it can be seen that a flexible scrubber system can be provided. In the system illustrated in FIG. 7, for example, the middle scrubber unit is closed and inoperative while the outermost scrubber units are opened to receive the gas stream thereby permitting the middle scrubber unit to act as a reserve unit or have repairs or maintenance performed on it. In this way, the operation with which a scrubber system is employed can be retained on a continuous basis.

What is claimed is:

1. A scrubber for removing solid particulate and gaseous pollutants from a gas stream as said stream is circulated and conveyed therethrough, said scrubber comprising: a support base having associated therewith parallel side walls and a removable top defining a passage for the flow of a hot waste gas stream therethrough; a plurality of vertical, scrubber tubes; means for independently and removable mounting the lower ends of said scrubber tubes in said support base to provide parallel rows of said tubes in direct communication with a water supply in said base, each row being offset from each adjacent row such that said scrubber tubes are arranged in a staggered relationship transverse to the direction of flow of a gas stream to be circulated and conveyed therethrough; means for pumping water upwardly through said scrubber tubes such that the water is forced out of the tops thereof and is permitted to flow and cascade down and about their outer surfaces; said base further comprising supplemental means at the lower portion of said scrubber for engaging and supporting said tubes and for removing contaminated water containing solid particulate and gaseous pollutants from the scrubber, individually detachable spacing and securing means at the upper ends of said tubes, and said removable top comprising a plate member in closely spaced relation to the upper ends of said scrubber tubes, said plate member resting on said spacing and securing means to apply downward pressure to said tubes and serving to deflect water from the tops of said scrubber tubes downwardly between and about the outer surfaces thereof.

2. The scrubber as defined in claim 1 wherein said support base mounting means comprises the top member of a water box through which water is supplied to said scrubber tubes and which is provided with a plurality of apertures extending through said top member, said apertures having a diameter about equal to the inside diameter of said scrubber tubes; an enlarged recess in coaxial alignment with each of said apertures and extending partially through said top member from the upper surface thereof such that a shoulder is formed in each of said apertures, said recesses having a diameter sufficient to freely receive said scrubber tubes therein such that the ends of said scrubber tubes are set in place on and in water sealing engagement with said shoulders.

3. The scrubber as defined in claim 2 wherein a gasket material is provided on said shoulders beneath the ends of said scrubber tubes.

4. The scrubber as defined in claim 1 wherein said spacing and securing means comprise spanner members slidably engaging upper ends of adjacent tubes within said parallel rows and longer spanner members slidably engaging upper ends of tubes in adjacent staggered rows.

5. The scrubber as defined in claim 2 wherein said supplemental means comprises a structure of cast material having an upper surface inclined downwardly toward the discharge end of the scrubber and upwardly spaced from the lower ends of said tubes, and said cast material having cylindrical sockets therein aligned with the enlarged recesses in the top member of said water box thereby providing supplemental support for the lower ends of said scrubber tubes while permitting them to be individually removed and replaced.

* * * * *